United States Patent [19]

Pang

[11] 4,152,744
[45] May 1, 1979

[54] SOLID STATE TRIPPING CIRCUIT
[75] Inventor: Peter Pang, Hong Kong, Hong Kong
[73] Assignee: Gould Inc., Rolling Meadows, Ill.
[21] Appl. No.: 807,585
[22] Filed: Jun. 17, 1977
[51] Int. Cl.² .............................................. H02H 3/08
[52] U.S. Cl. ......................................... 361/94; 361/98
[58] Field of Search ....................... 361/93, 94, 95, 96, 361/97, 98, 195, 196; 307/293

[56] References Cited
U.S. PATENT DOCUMENTS

| 3,419,757 | 12/1968 | Steen | 361/96 |
|---|---|---|---|
| 3,657,605 | 4/1972 | Hill | 361/95 |
| 3,666,994 | 5/1972 | Watson et al. | 361/96 |
| 3,846,675 | 11/1974 | Shimp | 361/95 |
| 4,060,844 | 11/1977 | Davis et al. | 361/96 |

Primary Examiner—Patrick R. Salce
Attorney, Agent, or Firm—Ostrolenk, Faber, Gerb & Soffen

[57] ABSTRACT

The primary winding of a saturable transformer, coupled to an a.c. circuit, drives the core of the transformer into saturation during at least a portion of the cycle of an a.c. current flowing through the circuit. A plurality of rise-time indicator pulses, having a duration inversely proportional to the rate of rise of the a.c. current being monitored, is induced in the secondary winding of the saturable transformer. The rise-time indicator pulses appearing in the secondary winding of the saturable transformer are applied to a pick-up circuit which generates a plurality of rectangular pulses whenever the a.c. current exceeds the normal rated value of the circuit. The pulses generated by the pick-up circuit each have a duty cycle inversely proportional to the rate of rise of the a.c. current being monitored. An inverter circuit, responsive to the pulses generated by the pickup circuit, generates a second series of rectangular pulses having a duty cycle proportional to the rate of rise of the a.c. current being monitored. The second series of pulses are applied to a tripping circuit which monitors the duty cycles of these pulses and interrupts a.c. current flow in said circuit after a time delay which is inversely proportional to the magnitude of the a.c. current being monitored.

12 Claims, 4 Drawing Figures

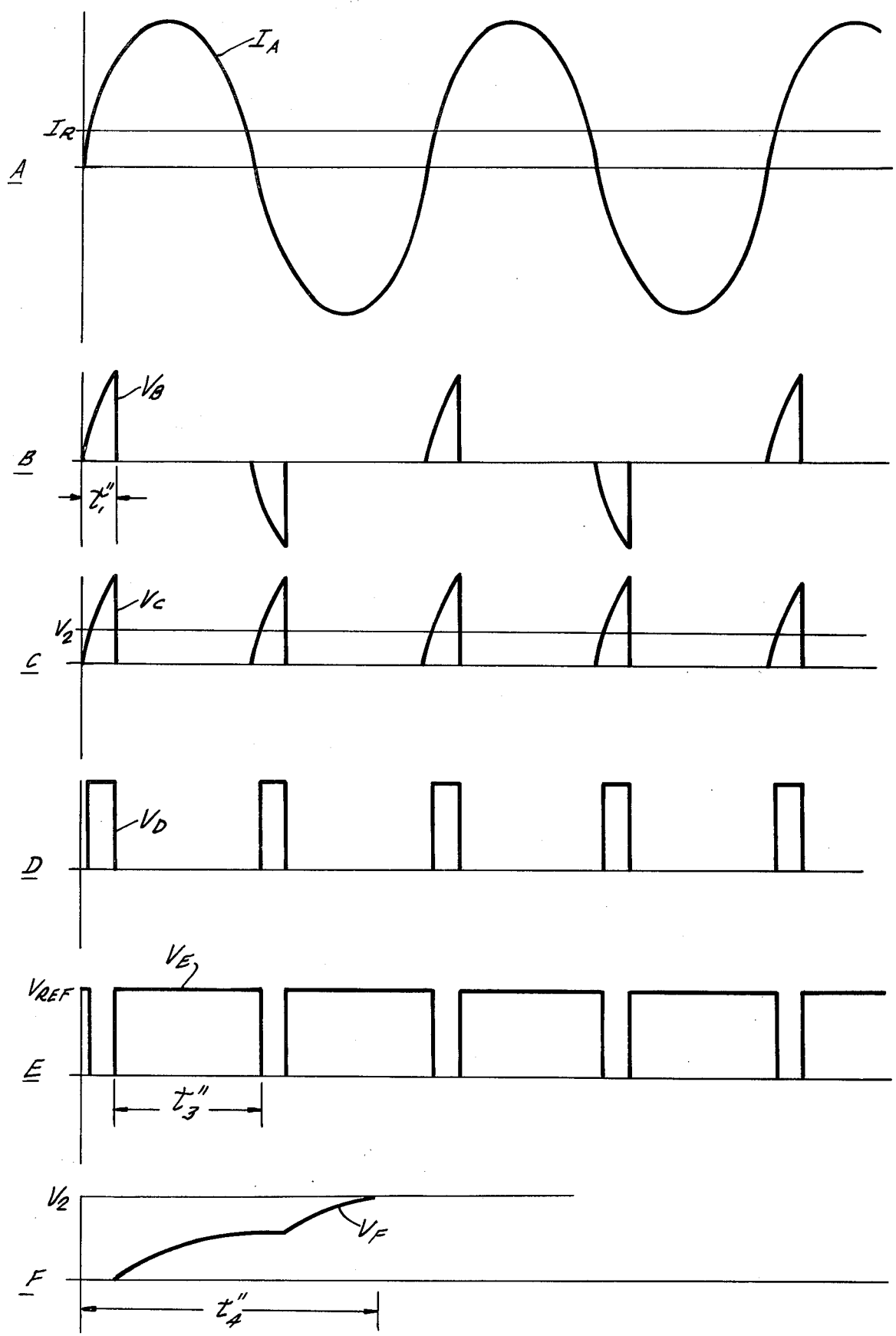

SOLID STATE TRIPPING CIRCUIT

BACKGROUND OF THE INVENTION

The use of static relays in the field of power transmission and distribution has increased rapidly in recent years due to the absence of moving mechanical parts resulting in a long and reliable operating life. Typical of such static relays is that described in U.S. Pat. No. 3,319,127 assigned to the assignee of the present invention.

Circuits of the foregoing type monitor the a.c. current flowing through a circuit and apply the monitored current to a timing circuit which generates a tripping signal in accordance with an inverse time-current relationship depending upon the magnitude of the overload condition being sensed. Whenever a sufficiently severe overload condition occurs, the timing circuit generates a tripping signal which trips a protective device such as a circuit breaker.

BRIEF DESCRIPTION OF THE PRESENT INVENTION

In the present invention, a saturable transformer is utilized to generate a series of rise-time indicator pulses having a width which is inversely proportional to the rate of rise of the a.c. current being monitored. The rate of rise of this current is indicative of the magnitude of the a.c. current in the circuit being monitored and may be used to selectively trip a protective device such as a circuit breaker in accordance with a desired inverse time vs. current characteristic whenever the magnitude of current in the circuit being monitored increases above the rated value of the circuit.

More particularly, the present invention includes a saturable transformer having a primary winding, a secondary winding and a saturable core. The primary winding of the saturable transformer is coupled to the circuit being monitored and drives the core of the transformer into saturation during at least a portion of the cycle of the a.c. current whenever the a.c. current exceeds the normal rated value of the circuit.

As a result of the periodic saturation of the transformer, a rise-time indicator signal comprising a plurality of rise-time indicator pulses is induced in the secondary winding of the transformer. The width of each pulse is inversely proportional to the time it takes the signal being monitored to drive the transformer into saturation after desaturation of the core (which occurs at the zero crossover point of the monitored waveform). Accordingly, the width of each rise-time indicator pulse is inversely proportional to the rate of rise of the a.c. current being monitored and is therefore representative of the amplitude of such current.

The rise-time indicator pulses appearing at the secondary winding of the saturable transformer are applied to a pick-up circuit including a diode bridge and an electronic switch. If the circuit current exceeds the rated value, the pick-up circuit generates a plurality of pulses having a duty cycle inversely proportional to the rate of rise of the a.c. current being monitored.

Pulses generated by the pick-up circuit are applied to an inverter circuit which generates a third series of pulses each having a duty cycle proportional to the rate of rise of the a.c. current being monitored. Significantly, the inverter circuit is designed to remain inoperable until the a.c. current first exceeds the rated value of the circuit. The importance of this feature is made clear below. Pulses generated by the inverter circuit are applied to a tripping circuit which monitors the duty cycle (and therefore the duration) of the pulses generated by the inverter circuit and interrupts a.c. current flow in the circuit after an appropriate time delay which is inversely proportional to the duration of the pulses generated by the inverter circuit and therefore inversely proportional to the magnitude of the a.c. current being monitored.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 4A through 4F are graphs illustrating several waveforms appearing at various locations within the circuit of FIG. 1 when the magnitude of the current in the circuit being monitored is much greater than the rated value.

DETAILED DESCRIPTION OF THE DRAWINGS

Figure 1:
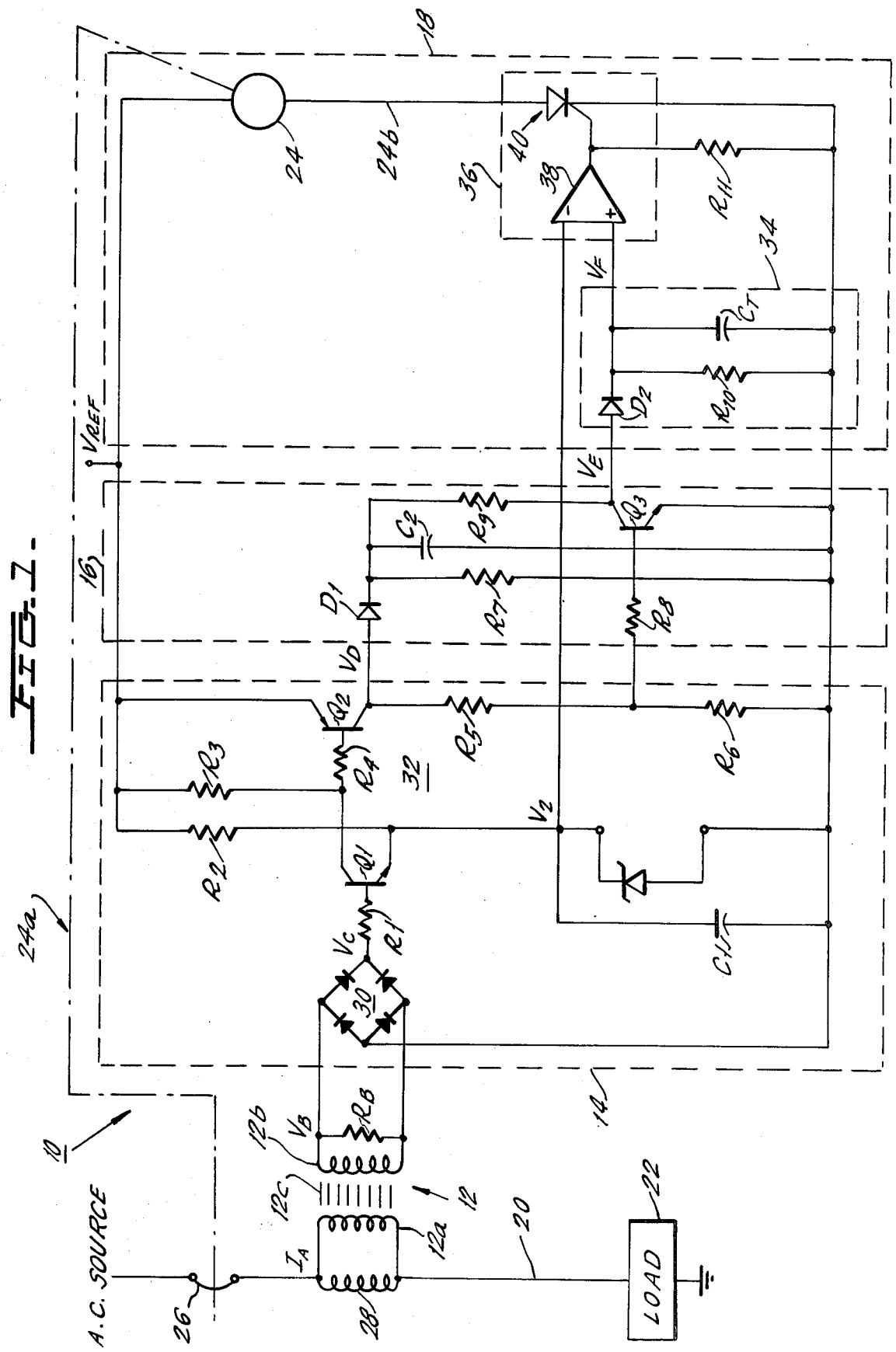
FIG. 1 is a schematic diagram of a solid state tripping circuit constructed in accordance with the principles of the present invention.

Referring now to FIG. 1, there is shown a solid state tripping circuit constructed in accordance with the principles of the present invention and designated generally as 10. Solid state tripping circuit 10 comprises a saturable reactor 12, a pick-up circuit 14, an inverter circuit 16 and a tripping circuit 18. Circuit 10 monitors the a.c. current in a line 20 which feeds a load 22. Whenever the current in line 20 attempts to increase above some predetermined value which is greater than the rated value of line 20, circuit 10 senses the overload condition and, after an appropriate time delay, energizes a magnetic latch 24 which is mechanically coupled at broken line 24a to separable contact mechanism 26. Latch mechanism 24 is adapted to cause substantially simultaneous separation of contact 26, and hence interruption of the current flowing in line 20, responsive to a flow of operating current in the electrical input line 24b of magnetic latch 24. As will be described in greater detail below, tripping circuit 18 causes current to flow in line 24b whenever the current in line 20 rises above a predetermined value greater than the rated value of the line 20 for a time period which is inversely proportional to the line current.

While the present invention is described in terms of operation in a one-phase, one-wire circuit, it should be understood that the present invention is equally applicable to any power carrying circuit having at least one conductor exclusive of any return conductor, and that the contacts separation mechanism 26 may be of any type consistent with the current interruption requirements capacity to be actuated by means of a latch mechanism responsive to an electrical output. In those circumstances where a three-phase, three-line circuit is being monitored, three saturable reactors are used and the outputs of the three saturable reactors are connected in series additive manner through three separate diode bridges in the manner shown in U.S. Pat. No. 3,792,313, assigned to the assignee of the present invention. In such three-phase applications, the instantaneous current available from each power conductor varies as a function of phase and load, whereby only one of the currents will be instantaneously greater than the remaining currents. This current will be converted to a voltage by an associated burden resistor and the voltage associated with the highest line current will appear at the series additive output of the three diode bridges. This output may then be utilized in the same manner as the output of the saturable transformer 12 of the circuit of FIG. 1.

Figure 2:
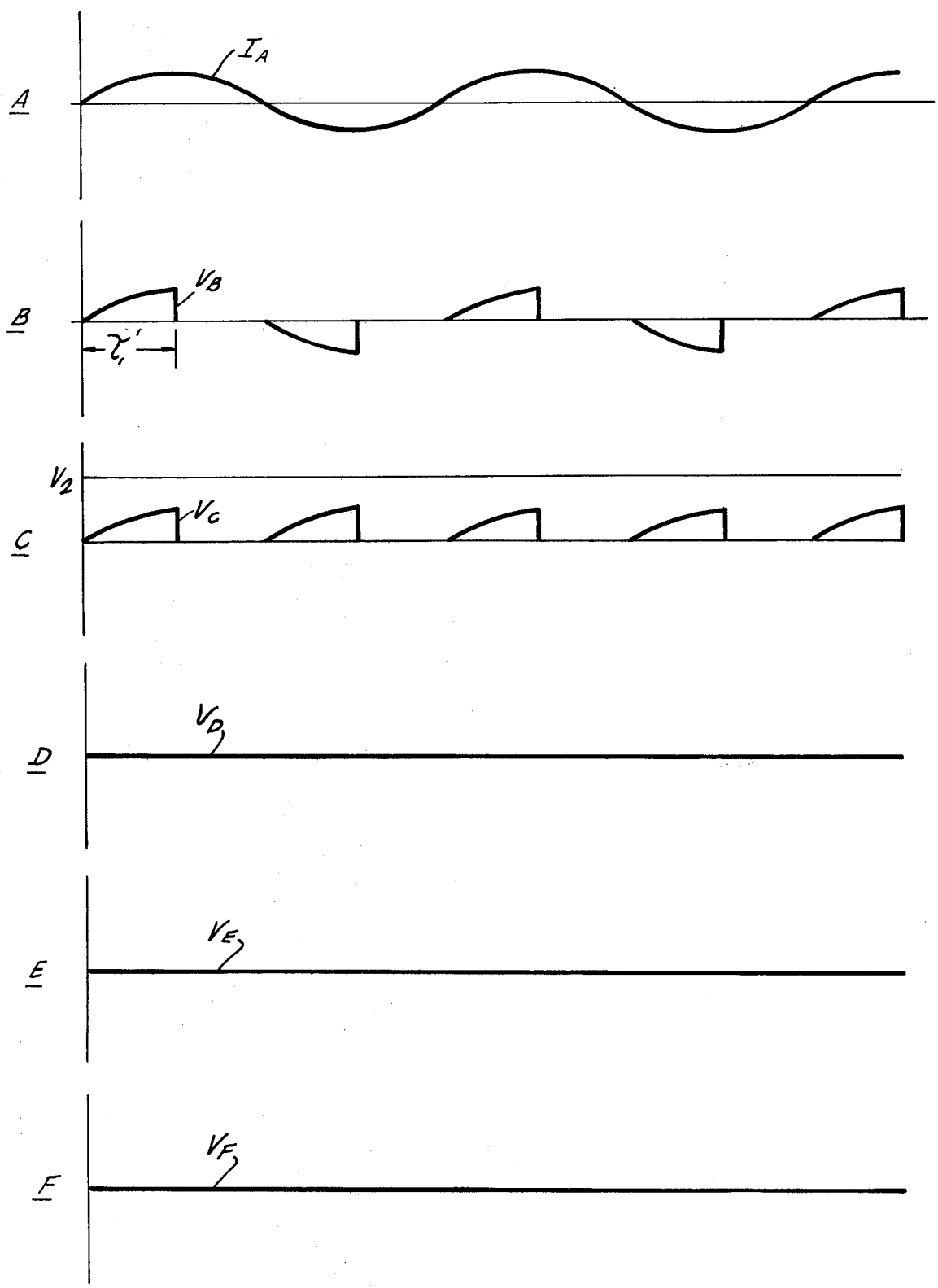
FIGS. 2A through 2F are graphs illustrating several waveforms appearing at various locations within the circuit of FIG. 1 when the current in the circuit being monitored is below the rated value of the circuit being monitored.
Figure 3:
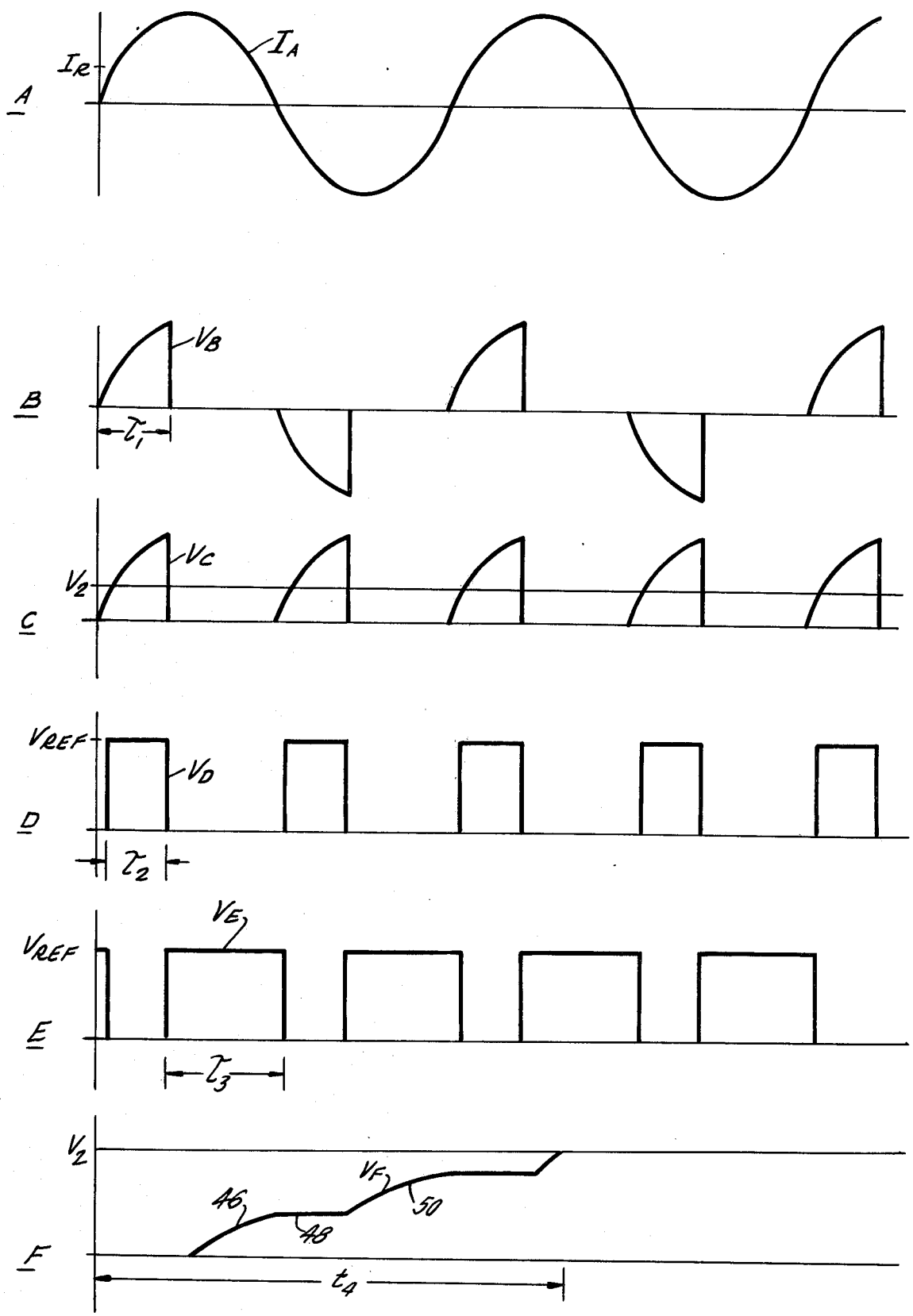
FIGS. 3A through 3F are graphs illustrating several waveforms appearing at various locations within the circuit of FIG. 1 when the magnitude of the current in the circuit being monitored is slightly greater than the rated value.

Returning now to FIG. 1, saturable reactor 12 comprises a primary winding 12a, a secondary winding 12b, and a saturable core 12c. The primary winding 12a of saturable transformer 12 is coupled to line 20 via tertiary winding 28. The current signal appearing in primary winding 12a is illustrated in FIGS. 2A, 3A and 4A. In FIGS. 2A through 2F the current through line 20 is assumed to be below its rated value. In FIGS. 3A through 3F the current in line 20 is assumed to be slightly above its rated value. In FIGS. 4A through 4F the current in line 20 is assumed to be much greater than its rated value. The operation of circuit 10 will be initially described with reference to FIGS. 3A through 3F.

FIG. 3A illustrates the current in primary winding 12A when the current through line 20 is slightly above the rated value. This current $I_A$ is proportional to the current through line 20 and drives core 12c into saturation whenever the time-current characteristics of the transformer 12 have been exceeded. As a result, a rise-time indicator signal $V_B$ will appear across burden resistor $R_B$ connected in parallel with secondary winding 12b. This signal is illustrated in FIG. 3B and comprises a plurality of pulses each having a pulse width $\tau_1$. The leading edge of each pulse is generated when the a.c. current in line 20 crosses through the zero point and the trailing edge of each pulse is generated when the core 12c is driven into saturation. Accordingly, the width $\tau_1$ of each pulse is determined by the time it takes for the a.c. current in line 20 to drive core 12c into saturation. The greater the rate of rise of the current passing through line 20 (and therefore the greater the magnitude of the current passing through line 20), the less time required to drive the core 12c into saturation. Accordingly, the width of each rise-time indicator pulse $V_B$ is inversely proportional to the rate of rise of current passing through line 20.

The rise-time indicator pulses $V_B$ are applied to the full-wave bridge rectifier 30 of pick-up circuit 14. Pick-up circuit 14 is enabled whenever the current through line 20 exceeds the rated value. When this condition occurs pick-up circuit 14 generates a plurality of pulses at its output $V_D$, each pulse having a duty cycle which is inversely proportional to the rate of rise of the current in line 20. More particularly, each pulse generated by pick-up circuit 14 has a constant height $V_{ref}$ and a pulse width $\tau_2$ which is inversely proportional to the rate of rise of the a.c. current in line 20.

Pulse generating circuit 14 comprises full-wave bridge rectifier 30 and an electronic switch 32. The bridge rectifier 30 is connected between the secondary winding 12b of transformer 12 and electronic switch 32 and inverts all of the negative going rise-time indicator pulses appearing across burden resistor $R_B$. The inverted pulses (see FIG. 3C) are applied to the base of transistor Q1 through resistor R1. Transistor Q1 is part of electronic switch 32 which also comprises transistor Q2, zener diode Z1, capacitor C1, and resistors R2-R6. Zener diode Z1 is chosen such that transistor Q2 will be enabled only when the current in line 20 exceeds the rated value. Thus by providing a pair of plug-in terminals 42,44 it is possible to adapt circuit 10 for any rated current by merely changing zener diode Z1. A capacitor C1 shunts diode Z1 so as to filter transients and maintain a fixed voltage across the zener diode. Transistor Q1 turns on and pick-up circuit 14 becomes active whenever the line current exceeds the rated value.

The relationship between the output signal of the bridge rectifier 30 and the biasing voltage $V_z$ is shown in FIG. 3C. As long as the voltage $V_C$ remains below the value $V_z$, transistor Q1 remains off and no current flows through resistor R3. As a result, the voltage at the base and emitter of transistor Q2 is equal and transistor Q2 is biased off. So biased, transistor Q2 remains an open circuit and the output $V_D$ of pulse generating circuit 14 remains at zero volts d.c.

When voltage $V_C$ rises above biasing voltage $V_z$, transistor Q1 turns on and current flows through resistor R3, transistor Q1 and zener diode Z1. The current flowing through resistor R3 causes a voltage drop between the emitter and base of transistor Q2 which cause transistor Q2 to turn on. When transistor Q2 is on, current flows through resistors R5 and R6 and the voltage $V_D$ jumps to the reference value $V_{ref}$ determined by the biasing voltage applied to the emitter of transistor Q2. See FIGS. 1 and 3D. $V_{ref}$ can be provided by a battery or by any other suitable power circuit.

Transistors Q1 and Q2 will remain on, and the output voltage $V_D$ will remain at the $V_{ref}$ level, until transformer 12 saturates and voltage $V_C$ drops to zero volts d.c. At this point, transistors Q1 and Q2 turn off and the output voltage $V_D$ of pick-up circuit 14 drops to zero volts d.c. Accordingly, pick-up circuit 14 generates a plurality of pulses having a constant height $V_{ref}$ and a width $\tau_2$ which is inversely proportional to the rate of rise of the a.c. current in line 20.

The pulses generated by pulse generating circuit 14 are applied to inverter circuit 16 which comprises transistor Q3, capacitor C2, diode D1 and resistors R7-R9. Inverter circuit 16 is responsive to the pulses generated by pick-up circuit 14 and generates a plurality of pulses at its output $V_E$ which are proportional to the rate of rise of the a.c. current in line 20. As will become apparent from the following, inverter circuit must remain inoperable until the line current first exceeds the rated value. For this reason, no power is applied to inverter circuit 16 until the current in line 20 exceeds the rated value.

When a pulse is generated by pick-up circuit 14, voltage $V_D$ rises to the $V_{ref}$ value and powers inverter circuit 16. At the same time a positive voltage $kV_{ref}$ (k being determined by the voltage divider R5,R6) is applied to the base of transistor Q3 via resistor R8 causing transistor Q3 to turn on. As transistor Q3 turns on, the output $V_E$ of inverter circuit 16 drops to zero volts d.c. and the positive voltage $V_{ref}$ appearing at the output of pulse generator 14 is applied to capacitor C2 via diode D1. The charging time of capacitor C2 is determined by resistors R7 and R9 which are chosen such that the cathode of diode D1 charges to the $V_{ref}$ value substantially instantaneously. As long as the output of pulse generating circuit 14 remains high, the output of inverter circuit 16 remains at zero volts d.c. and capacitor C2 remains charged at the $V_{ref}$ value.

When the output voltage $V_D$ of pulse generating circuit 14 drops to zero volts d.c., the positive voltage is removed from the base of transistor Q3 and transistor Q3 turns off. With transistor Q3 off, the output voltage $V_E$ of inverting circuit 16 jumps to the $V_{ref}$ value determined by the charge across capacitor C2. The discharging time of capacitor C2 is determined by resistors R7, R9 and R10 which are chosen so that capacitor C2 discharges at a very slow rate. The discharge rate of capacitor C2 is chosen to be sufficiently slow that the output voltage $V_E$ remains substantially constant throughout at least one half cycle of the a.c. current in line 20. In this manner, inverter circuit 16 generates a plurality of pulses having a constant height $V_{ref}$ and having a pulse width $\tau_3$ which is proportional to the rate of rise of the current in line 20. See FIG. 3E.

The pulses generated by inverter circuit 16 are applied to the anode of diode D2 in tripping circuit 18. Tripping circuit 18 comprises timing circuit 34 and firing circuit 36 and enables magnetic latch 24 (thereby interrupting the flow of a.c. current in line 20) an appropriate time after the a.c. current in line 20 has exceeded the rated value, the time delay being inversely proportional to the magnitude of the line current. By way of example, tripping circuit 18 will enable magnetic latch 24 and trip contact mechanism 26 after a 10 minute delay when the current in line 20 is 1.15 times the rated current.

Timing circuit 34 generates a timing signal $V_F$ representative of the cumulative duration of successive pulses $V_E$ generated by inverter circuit 16. More particularly, timing circuit 34 both integrates the pulses generated by inverter circuit 16 and developes a timing signal $V_F$ which is indicative of the cumulative magnitude of successive integrations.

Timing circuit 34 comprises a diode D2, a resistor R10 and a timing capacitor $C_T$. Whenever a new pulse $V_E$ is applied to timing circuit 34, its output $V_F$ rises exponentially for the duration of the pulse. The charging rate of timing circuit 34 is determined by the product R9, $C_T$. See portion 46 of the curve of FIG. 3F. The value of resistor R10 is chosen such that the discharge rate of timing capacitor $C_T$ is extremely slow. Accordingly, when the output $V_E$ of inverter circuit 16 returns to zero volts d.c., the capacitor $C_T$ holds its charge until the next pulse arrives. See portion 48 of the curve of FIG. 3F. As the next pulse $V_E$ is applied to timing circuit 34, the charge across capacitor $C_T$ increases at the exponential rate until the output of inverter circuit 16 returns to the zero volts d.c. level. See portion 50 of the curve of FIG. 3F. The charge across capacitor $C_T$ (and therefore the magnitude of timing signal $V_F$) will continue increasing until it reaches the zener diode voltage $V_z$ at which point comparator 38 will fire SCR 40 and magnetic latch 24 will open contact mechanism 26. To simplify illustration of waveform $V_F$, FIG. 3F shows the timing signal $V_F$ charging to the firing voltage $V_z$ after approximately four pulses, it should be recognized that in an actual application, the number of pulses required to charge capacitor $C_T$ to the firing voltage $V_z$ would normally be much greater.

It should be clear from the foregoing that the time $\tau_4$ takes capacitor $C_T$ to charge the firing voltage is inversely proportional to the duration of the pulses generated by inverter circuit 16. Since the pulses generated by inverter circuit are directly proportional to the line current 20, the time it takes for timing signal $V_F$ to charge to the firing voltage, is inversely proportional to the line current.

Referring now to FIG. 2A–2F, the operation of circuit 10 will be described when the line current 20 is less than the rated value. In this condition, the current in line 20 will induce a current $I_A$ in the primary winding 12a of saturable transformer 12. This current $I_A$ is proportional to the current through line 20 and drives core 12c into saturation whenever the time-current characteristics of transformer 12 have been exceeded. As a result, rise-time indicator pulses $V_B$ appear across burden resistor $R_B$ connected in parallel with secondary winding 12b. This signal is illustrated in FIG. 2B and comprises a plurality of pulses each having a pulse width $\tau_1'$. Since the current $I_A$ in FIG. 2A is of smaller magnitude than the current $I_A$ in FIG. 3A, the pulse width $\tau_1'$ of the time indicator signal $V_B$ is greater than the pulse width $\tau_1$ of the rise-time indicator pulses $V_B$ illustrated in FIG. 3B. That is, when the a.c. current in line 20 is below the rated value, it takes a longer time for the induced current $I_A$ to drive core 12c into saturation.

The rise-time indicator pulses $V_B$ are rectified by full-wave bridge rectifier 30 and a plurality of pulses $V_C$ appear at the base of transistor Q1. See FIG. 2C. Since the current in line 20 is below the rated value, the height of the pulses $V_C$ applied to the base of transistor Q1 never rise above the biasing voltage $V_z$ determined by zener diode Z1 and pick-up circuit 14 is never enabled. Accordingly, no pulses are generated at the output $V_D$ of pick-up circuit 14. See FIG. 2D.

If inverter circuit 16 were a standard inverter circuit, its output $V_E$ would be "high" and would begin charging timing-circuit 34. Since this would have the undesirable result of opening contact 26 while the current in line 20 remains below the rated value, inverter circuit 16 is not energized until the current in line 20 exceeds the rated value. Particularly, since transistor Q2 is off, the reference voltage $V_{ref}$ is not applied to inverter circuit 16 and there is no charge across capacitor C2. For this reason, the output of the inverter circuit $V_E$ remains at zero volts d.c. See FIG. 2E. Since the output of inverter circuit 16 is at zero volts d.c., no charging current is applied to timing circuit 34 and the timing signal $V_F$ will not charge to the firing voltage $V_z$.

Referring now to FIG. 4, the operation of circuit 10 will be described when the current in line 20 is much larger than the rated value. As noted above, the current in line 20 induces a proportional current $I_A$ in primary winding 12a of saturable transformer 2. Since the rise-time of induced current $I_A$ is relatively great, transformer 12 will be driven into saturation in a relatively short period of time and rise-time indicator pulses $V_B$ will have a relatively short pulse width $\tau_1''$ which is inversely proportional to the rise-time of the line current. See FIG. 4B.

The rise-time indicator pulses $V_B$ are rectified by full-wave bridge rectifier 30 and applied to the base of transistor Q1 causing pick-up circuit 14 to generate a plurality of pulses $V_D$ whose duty cycle is inversely proportional to the rate of rise of the line current. The pulses generated by pick-up circuit 14 are applied to inverter circuit 16 which generates a plurality of pulses $V_E$ whose duty cycle is proportional to the magnitude of the current in line 20. Since the pulse duration of pulses $V_E$ are relatively large, timing capacitor $C_T$ charges to the firing voltage $V_z$ in a relatively short period of time $\tau_4''$ thereby opening contact 26 after a relatively brief time delay.

In the foregoing analysis, it was assumed that the magnitude of the current flowing through line 20 was always sufficiently large to drive saturable transformer 12 into saturation during at least a portion of the a.c. current cycle. Such a condition is not necessary when the current in line 20 is below the rated value. Accordingly, the parameters of circuit 10 can be chosen such that saturable transformer 12 is only driven into saturation when the current through line 20 exceeds the rated value by some predetermined amount.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for interrupting an a.c. current flowing through a circuit having a normal rated value, comprising:
    (A) a saturable transformer having a primary winding, a secondary winding and a saturable core, said primary winding being coupled to said circuit and adapted to generate a flux in said core, said flux being representative of the rate of rise of said a.c. current;
    (B) first means coupled to said secondary winding for generating pulses having a duty cycle proportional to the rate of rise of said a.c. current, said first means comprising:
        (1) pick-up means for generating pulses having a duty cycle inversely proportional to the rate of rise of said a.c. current, said pickup means to generate said pulses only after said a.c. current exceeds said normal rated value; and
        (2) inverter means responsive to the pulses generated by said pickup means for generating pulses having a duty cycle proportional to the rate of rise of said a.c. current, whereby said inverter means generates pulses only after said a.c. current exceeds said rated value.

2. Apparatus as in claim 1 wherein said primary winding is adapted to drive said core into saturation during at least a portion of the cycle of said a.c. current whenever said a.c. current exceeds said normal rated value.

3. Apparatus as in claim 1 where said pulses generated by said pick-up means have a predetermined height and a width which is inversely proportional to the rate of rise of said a.c. current.

4. Apparatus as in claim 3 wherein the rising edge of each said pulse generated by said pick-up means is generated when the absolute value of said a.c. current rises above said rated value and the trailing edge of each said pulse generated by said pick-up means is generated when said saturable transformer becomes saturated.

5. Apparatus as in claim 3 wherein said pick-up means comprises an electronic switch which is turned on when the absolute value of said a.c. current rises above said rated value and which is turned off when said saturable transformer saturates.

6. Apparatus as in claim 1 wherein said pulses generated by said inverter means have a predetermined height and a width which is proportional to the rate of rise of said a.c. current.

7. Apparatus as in claim 6 wherein the rising edge of each of said pulses generated by said inverter means is generated when said saturable transformer saturates and the trailing edge of each of said pulses generated by said inverter means is generated when the absolute value of said a.c. current rises above said rated value.

8. Apparatus as in claim 1 wherein said second means comprises:
    timing means for generating a timing signal representative of the cumulative duration of successive pulses generated by said first means; and
    means for monitoring said timing signal and for interrupting said a.c. current flow in said circuit after a time delay which is inversely proportional to the duration of said pulses.

9. Apparatus as in claim 8 wherein said timing means comprises means for integrating each of said pulses generated by said first means and means for generating a timing signal respresentative of successive said integrations.

10. Apparatus as in claim 9 wherein said means for monitoring comprises:
    a comparator having inverting and non-inverting inputs, and an output, one of said inverting and non-inverting inputs being coupled to said timing means, the remaining of said inverting and non-inverting inputs being biased at a level corresponding to said rated value;
    electronic switch means coupled to said output of said comparator for generating an output signal whenever said timing signal generated by said timing means rises above said level corresponding to said rated value; and
    current interrupting means responsive to said output signal for interrupting current flow in said circuit.

11. Apparatus in accordance with claim 9 wherein said integrating means comprises an RC circuit.

12. Apparatus in accordance with claim 11 wherein said means for generating a timing signal includes means for preventing said RC circuit from discharging between successive said pulses.

* * * * *